United States Patent
Aggarwal

(10) Patent No.: US 9,652,504 B2
(45) Date of Patent: May 16, 2017

(54) SUPERVISED CHANGE DETECTION IN GRAPH STREAMS

(71) Applicant: International Business Machines Corporation, Armonk, NY (US)

(72) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 14/479,969

(22) Filed: Sep. 8, 2014

(65) Prior Publication Data

US 2016/0070817 A1    Mar. 10, 2016

(51) Int. Cl.
*G06F 17/30* (2006.01)
(52) U.S. Cl.
CPC .............................. *G06F 17/30516* (2013.01)
(58) Field of Classification Search
CPC .... G06F 17/30; G06F 17/00; G06F 17/30958; G06F 17/30607; G06F 17/30516
USPC .................................................. 707/600–899
See application file for complete search history.

(56) References Cited

U.S. PATENT DOCUMENTS

| 8,040,798 | B2 | 10/2011 | Chandra et al. |
| 8,041,743 | B2 | 10/2011 | Armstrong et al. |
| 8,108,435 | B2 | 1/2012 | Mershon et al. |
| 8,392,398 | B2 | 3/2013 | Aggarwal et al. |
| 2006/0265664 | A1* | 11/2006 | Simons ................... A62B 99/00 715/772 |
| 2008/0059115 | A1* | 3/2008 | Wilkinson .............. G06F 17/18 702/179 |

FOREIGN PATENT DOCUMENTS

WO    2012103403 A1    8/2012

OTHER PUBLICATIONS

V.E. Lee et al., "A Survey of Algorithms for Dense Subgraph Discovery," Managing and Mining Graph Data, Advances in Database Systems, Jan. 2010, pp. 303-336, vol. 40.
J. Riedy et al., "Multithreaded Community Monitoring for Massive Streaming Graph Data," IEEE 27th International Symposium on Parallel & Distributed Processing Workshops and PhD Forum, May 2013, pp. 1646-1655.
A.E. Sariyuce et al., "Streaming Algorithms for k-core Decomposition," Proceedings of the VLDB Endowment, Aug. 2013, 12 pages, vol. 6, No. 5, Riva del Garda, Trento, Italy.
L.B. Holder et al., "Graph-Based Structural Pattern Learning," The University of Texas at Arlington, Final Technical Report AFRL-IF-RS-TR-2006-249, Jul. 2006, 21 pages.
Jeffrey Kai Chi Chan, "Discovering Regions of Correlated Change in Dynamic Graphs," The University of Melbourne, Department of Computer Science and Software Engineering, Feb. 2009, 249 pages.

(Continued)

*Primary Examiner* — Isaac M Woo
(74) *Attorney, Agent, or Firm* — Kurt Goudy; Ryan, Mason & Lewis, LLP

(57) ABSTRACT

A method includes obtaining a graph stream, obtaining historical data of one or more nodes associated with the graph stream, extracting one or more features from the graph stream for one or more nodes, and creating one or more alarm levels for the one or more nodes based on the one or more extracted features and the historical data.

20 Claims, 3 Drawing Sheets

(56) References Cited

OTHER PUBLICATIONS

C.C. Aggarwal et al., "On Clustering Graph Streams," Proceedings of the SIAM International Conference on Data Mining (SDM), Apr.-May 2010, pp. 478-489.

Charu C. Aggarwal, "On Classification of Graph Streams," Proceedings of the Eleventh SIAM International Conference on Data Mining (SDM), Apr. 2011, pp. 652-663.

C.C. Aggarwal et al., "On Dense Pattern Mining in Graph Streams," Proceedings of the VLDB Endowment, Sep. 2010, pp. 975-984, vol. 3, No. 1-2.

C.C. Aggarwal et al., "Outlier Detection in Graph Streams," IEEE 27th International Conference on Data Engineering (ICDE), Apr. 2011, pp. 399-409, Hannover, Germany.

S. Bhagat et al., "Applying Link-Based Classification to Label Blogs," 9th International Workshop on Knowledge Discovery on the Web (WebKDD) and 1st International Workshop on Social Networks Analysis (SNA-KDD), Lecture Notes in Computer Science, Aug. 2007, pp. 97-117, vol. 5439.

M. Bilgic et al., "Effective Label Acquisition for Collective Classification," Proceedings of the 14th ACM SIGKDD International Conference on Knowledge Discovery and Data Mining, Aug. 2008, pp. 43-51.

S. Brin et al., "The Anatomy of a Large-Scale Hypertextual Web Search Engine," Computer Networks and ISDN Systems, Apr. 1998, pp. 107-117, vol. 30, No. 1-7.

T.F. Coleman et al., "A Reflective Newton Method for Minimizing a Quadratic Function Subject to Bounds on Some of the Variables," SIAM Journal on Optimization, Nov. 1996, pp. 1040-1058, vol. 6, No. 4.

A. Das Sarma et al., "Estimating PageRank on Graph Streams," The Journal of the ACM (JACM), May 2011, pp. 1-19, vol. 58, No. 3, Article 13.

J. Feigenbaum et al., "Graph Distances in the Streaming Model: The Value of Space," Proceedings of the Sixteenth Annual ACM-SIAM Symposium on Discrete Algorithms (SODA), Jan. 2005, pp. 745-754, Vancouver, British Columbia, Canada.

Q. Lu et al., "Link-Based Classification," Proceedings of the Twentieth International Conference on Machine Learning (ICML), Aug. 2003, pp. 496-503.

S.A. MacSkassy et al., "Classification in Networked Data: A Toolkit and a Univariate Case Study," The Journal of Machine Learning Research, May 2007, pp. 935-983, vol. 8.

B. Taskar et al., "Discriminative Probabilistic Models for Relational Data," Proceedings of the Eighteenth Conference on Uncertainty in Artificial Intelligence (UAI), Aug. 2002, pp. 485-492.

T. Yang et al., "Combining Link and Content for Community Detection: A Discriminative Approach," Proceedings of the 15th ACM SIGKDD International Conference on Knowledge Discovery and Data Mining, Jun.-Jul. 2009, pp. 927-936, Paris, France.

P. Zhao et al., "gSketch: On Query Estimation in Graph Streams," Proceedings of the VLDB Endowment, Aug. 2012, pp. 193-204, vol. 5, No. 3, Istanbul, Turkey.

D. Zhou et al., "Learning with Local and Global Consistency," Advances in Neural Information Processing Systems (NIPS), Dec. 2003, pp. 321-328, vol. 16, Vancouver and Whistler, British Columbia, Canada.

D. Zhou et al., "Learning from Labeled and Unlabeled Data on a Directed Graph," Proceedings of the 22nd International Conference on Machine Learning (ICML), Aug. 2005, pp. 1036-1043, Bonn, Germany.

D. Zhou et al., "Semi-Supervised Learning on Directed Graphs," Advances in Neural Information Processing Systems (NIPS), Jul. 2005, pp. 1633-1640, vol. 17.

Y. Zhou et al., "Graph Clustering Based on Structural/Attribute Similarities," Proceedings of the VLDB Endowment, Aug. 2009, pp. 718-729, vol. 2, No. 1, Lyon, France.

X. Zhu et al., "Semi-Supervised Learning Using Gaussian Fields and Harmonic Functions," Proceedings of the Twentieth International Conference on Machine Learning (ICML), Aug. 2003, pp. 912-919.

Wikipedia, "Iterative Method," http://en.wikipedia.org/wiki/Iterative_method, Jul. 2014, 3 pages.

* cited by examiner

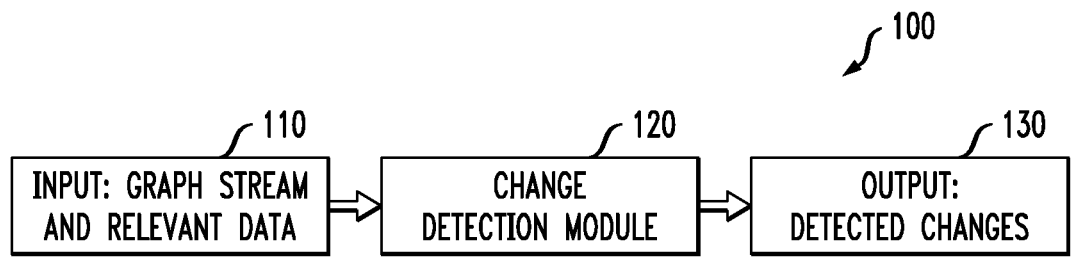
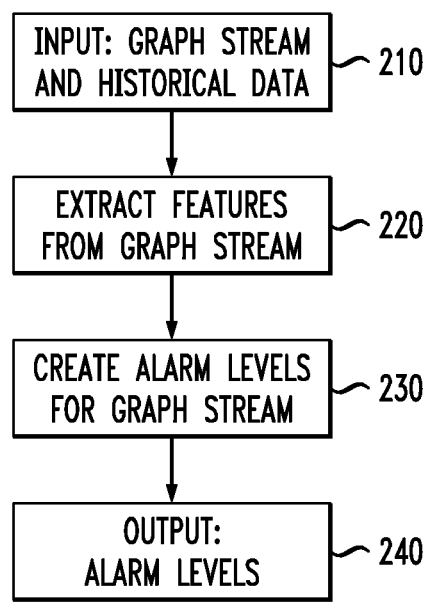

SUPERVISED CHANGE DETECTION IN GRAPH STREAMS

FIELD

The present application relates to the processing of graph streams, more particularly, to techniques for change detection in dynamic graph streams.

BACKGROUND

Many forms of network activity create large volumes of streaming data. Various data domains such as chemical data, biological data and the web are structured as graphs. In streaming applications, these graphs are pushed to servers that process such information as a stream. These graph streams may include nodes and edges. For example, in a web graph, the nodes may correspond to URL addresses and the edges may correspond to links between URL addresses.

Graph streams arise in the context of a wide variety of social, information and communication network scenarios, in some of which the nodes are labeled. In such social, information and communication networks, it is often desirable to track interesting properties of the underlying nodes as they change over time. These dynamic properties can often be represented in the form of time-dependent labels associated with the nodes. Dynamic or sudden changes in such node labels may be indicative of important events or patterns of activity. However, tracking these dynamic or sudden changes can be challenging. Existing methods tend to be designed for the classification of static graphs, rather than for the detection of changes and anomalies in dynamic graph streams.

SUMMARY

Embodiments of the invention provide techniques for change detection in dynamic graph streams.

For example, in one embodiment of the invention, a method comprises steps of obtaining a graph stream, obtaining historical data of one or more nodes associated with the graph stream, extracting one or more features from the graph stream for one or more nodes, and creating one or more alarm levels for the one or more nodes based on the one or more extracted features and the historical data.

In additional embodiments, an apparatus comprises a memory and a processor operatively coupled to the memory and configured to obtain a graph stream, obtain historical data of one or more nodes associated with the graph stream, extract one or more features from the graph stream for one or more nodes, and create one or more alarm levels for the graph stream based on the one or more extracted features and the historical data.

In further embodiments, an article of manufacture comprising a computer readable storage medium for storing computer readable program code. The computer readable code, when executed, causes a computer to obtain a graph stream, obtain historical data of one or more nodes associated with the graph stream, extract one or more features from the graph stream for one or more nodes, and create one or more alarm levels for the graph stream based on the one or more extracted features and the historical data As supervised change detection is an important problem in the context of graph streams, illustrative embodiments of the invention use a random walk based approach in the context of change analysis for the problem of change detection. The random walk based approach is used to extract features which are used to create a regression model. This model can then be used for the purposes of monitoring, supervising and/or detecting changes (e.g. an anomaly) in a graph stream.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 depicts an overview of a supervised change detection methodology according to an embodiment of the invention.

FIG. 2 depicts a methodology for supervised change detection of dynamic graph streams according to an embodiment of the invention.

DETAILED DESCRIPTION

Figure 3:
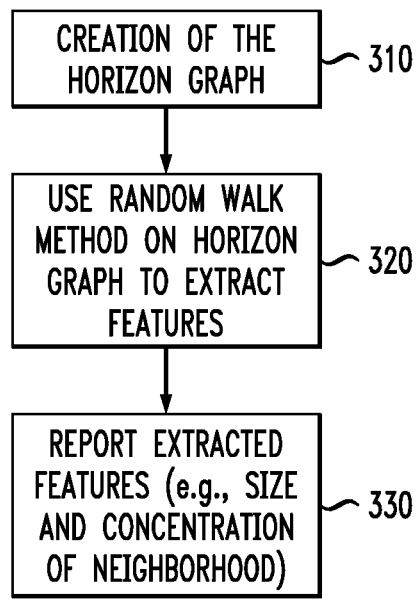
FIG. 3 depicts a feature extraction process of the methodology of FIG. 2.

Illustrative embodiments of the invention relate to the problem of differential classification in graph streams, in which significant classification events are predicted (i.e., the changes in classification labels of the nodes). Different from the static collective classification problem, this approach focuses on dynamic and real-time detection of changes in node classification, as opposed to the actual classification of nodes. Such dynamic changes are also referred to as supervised anomalies in the graph stream, because of the use of labels to model such changes. The supervised anomaly detection problem is a node-centric event detection problem, in which node labels are used in order to supervise the event detection process.

Illustrative embodiments of the invention provide "supervised" anomaly detection by learning from previous examples of "bad guys" or anomalies. These previous examples of anomalies provide information such as patterns, labels and other relevant information associated with the "bad" nodes that could be useful in identifying other potentially "bad" nodes. For example, knowing the activity the "bad" node was involved in and its neighborhood class concentration (e.g., the percentage of other "bad" guys in the neighborhood) at the time it was flagged as an anomaly can be helpful in identifying other potential "bad" nodes that exhibit similar characteristics.

As illustratively used herein, a graph stream can refer to any pair-wise activity between two parties. A graph stream may include a plurality of nodes and edges. As illustratively used herein, a node represents an element of the graph stream and an edge represents a connection or interaction between the nodes. For example, emails between Alice and Bob can be a graph stream, where the nodes are Alice and Bob and an edge is created each time an email is exchanged between Alice and Bob. As such, the number of edges increase over time and the graph stream evolves over time as well. The input graph stream is therefore continuous and in real-time.

Non-limiting examples of graph streams to which illustrative embodiments of the invention can be applied include:

(1) In a social or bibliographic network application, the classification labels at nodes may correspond to the actor's professional, personal or academic topics of interest. The nodes may therefore correspond to an actor and the edges may correspond to the interactions between the actors.

(2) In a communication network application, for example, in a web application, host requests to domains can be modeled as graph streams. The classification labels on nodes may correspond to intrusion labels. The nodes may therefore correspond to the hosts and domains and the edges may correspond to network requests between the nodes.

(3) In an information network application, the evolving relationships between the different entities can be treated as graph streams. For example, in a military information network, the class label could correspond to the estimation of whether an unknown information object (asset), with evolving relationships, belongs to a friend or foe. The nodes may therefore correspond to the different entities and assets and the edges may correspond to interactions between the entities and assets.

The edges in the graph stream may thus arrive continuously over time, as new relationships are formed over time. This tends to make the network relatively transient.

Illustrative embodiments of the invention relate to a dynamic scenario, in which the nodes are associated with dynamic and temporal node labels. Thus, the change of a label from one value to another is essentially a differential class event, the timely detection of which is more important from a knowledge discovery perspective, as opposed to the actual classification of the nodes themselves. Specifically, it is important to be able to detect such changes in the labels before the labels of the nodes have changed in the underlying network. Therefore, this problem is referred to as the differential classification problem, where the focus is on detecting node classification events in graph streams. Furthermore, illustrative embodiments of the invention relate to a dynamic scenario in the sense that the nodes are tracked continuously in real-time in order to detect key changes in the classification labels.

The differential classification problem has numerous applications. For example, in a communication network application, nodes may be labeled as normal or abnormal (i.e., an anomaly) depending upon whether or not they are currently involved in an intrusion attack. Nodes may move from normal to abnormal status in the graph stream, and vice-versa. As another example, in an information network application, nodes may be labeled depending upon their relevance or non-relevance to a topic of interest. The relevance of the node to a given topic may change, depending upon the changes in the underlying relationships of the node to other nodes. This observation is also true of social networks, in the context of different application-specific criteria.

Illustrative embodiments of the invention provide methods for the differential node classification problem in graph streams. These methods include designing a general differential random-walk based framework to transform the graph structure into a multi-dimensional streaming problem. This transformation is used to create a streaming, real-time prediction-model. The use of such an approach provides efficient and effective classification results.

Referring to the figures, FIG. 1 is a flow chart depicting the overall procedure for predicting differential class events from graph streams, the results of which are presented as alarm levels according to an illustrative embodiment of the invention. Methodology 100 starts at step 110 in which a graph stream and relevant data is used as input. Relevant data can be, for example, historical data associated with the nodes of the graph stream. Then in step 120, the inputs are processed by a change detection module. Details of the change detection module are further described in FIGS. 2-4 below. Finally at step 130, one or more detected changes in the graph stream are generated as output.

With reference to FIG. 2, which further describes the change detection module 120 of FIG. 1, the supervised change detection methodology is as follows. At step 210, a graph stream and the history of the associated node labels are used as input. As each node has associated with it a continuous label specifying the label (e.g., "normal" or "bad") and the activity of the node at each time instant, the historical data for the nodes may include the alarm levels, node labels and edges associated with the nodes at each time instant. Then at step 220, one or more features are extracted from the underlying one or more graph streams. As used herein, features refer to any attribute or aspect of the graph stream that is useful or relevant to the specific application at hand. The detailed description of the feature extraction process is provided in the context of FIG. 3. At step 230, regression modeling is used to create the alarm levels for the graph stream. The details of which are provided in the context of FIG. 4. Finally at step 240, the alarm levels are displayed as the output.

Given an incoming graph stream $S_t$ at time t of edge additions and deletions, which are superposed on the set of nodes N, it is assumed that the edges in the network are directed. However, methods of the present invention can be simplified to the undirected version of the problem. An edge is said to be active in the network at time t, if one or more instances of the edge were added before time t, but have not yet been deleted. The weight of the edge is equal to the number of instances of that edge at the time t. Associated with each node i is a label drawn from one of r different values $\{1 \ldots r\}$. The label of node i at time t is denoted by $L_t(i)$. The value of $L_t(i)$ can change with time t. The differential graph stream classification may be defined as follows.

Corresponding to step 210 of FIG. 2, given the graph stream $S_t$, together with the history of associated node labels, the goal is to determine the top k nodes, which are most likely to change from label $l_1 \in \{1 \ldots r\}$ to $l_2 \in \{1 \ldots r\}$. Thus, the input to the differential graph stream classification problem is the stream $S_t$, a pair of labels $l_1$ and $l_2$, horizon h, and the number k of nodes, which are most likely to be the next to change from label $l_1$ to $l_2$.

The structure of the underlying graph relates to the process of differential classification as follows:

(1) The classification behavior of the link-based neighborhoods of nodes are highly correlated in a wide variety of applications. This intuition forms the basis for most collective classification algorithms. This also means that changes in the class distribution of the link-based neighborhoods of nodes may also affect changes in the labels of the nodes. This observation implies that the immediate history of neighborhood class distribution can be useful for differential classification.

(2) The size of the neighborhood of a node (e.g., whether it is a hub), plays a role in the classification of the node.

For example, in a spam detection or intrusion detection application, the neighborhood sizes of such nodes may be affected by such unusual activity. This implies that the changes in the size of node neighborhoods should be reflected in the differential classification process.

One challenge with a dynamic approach is that the structure of the network changes rapidly, and therefore it is hard to use structural characteristics of the underlying graph directly in the classification process, unless they are encoded appropriately in a stream setting.

Therefore, in order to create a feature-based encoding of dynamic neighborhoods, a random-walk approach is used to construct node-specific features from the stream. These extracted features characterize the dynamics of the neighborhood of the different nodes, and are used to make predictions about the classification behavior of the nodes. For example, these features may correspond to the neighborhood size and the neighborhood class concentration. An important key is to perform effective feature extraction, and create node-specific neighborhood feature streams from the dynamic graph stream. These node-specific neighborhood feature streams are used for dynamic classification. This process creates a number of challenges, because of the large number of node-specific features, which need to be extracted in real time with the use of structural random-walk methods. As such, illustrative embodiments of the invention address these challenges in a unique manner as described below.

With reference to FIG. 3, which corresponds to step 220 of FIG. 2, the process of extracting features from the underlying graph stream is as follows. First, at step 310, a horizon graph is created. The neighborhood features which are used for the classification process are defined. Neighborhood features can include neighborhood size, neighborhood class concentration and any other features suitable to the specific application of the user. Here, the two main classes of features which are defined are constructed with respect to the class distribution of the neighborhood and the size of the neighborhood within a given temporal window. Since these features are designed to track temporal characteristics, they are defined with respect to a specific window of length h and are referred to as the horizon neighborhood size and horizon class distribution respectively.

The horizon graph for the stream S for a time window of length h at current time $t_c$ is denoted by $G(t_c, h)$, and is defined by all the edges in S, which arrived in the most recent interval of length h, i.e., within the interval $(t_c-h, t_c)$, but which have not been deleted at time $t_c$. The weight of an edge $w_{ij}(t_c, h)$ of an edge $(i, j)$ is defined by the number of times that it arrived in that interval, without being deleted.

The horizon graph can be used to explore the recent behavior of graph neighborhoods, as well as the underlying changes. The effective detection of such changes can be useful for the differential classification problem. All of the neighborhood properties and corresponding features are extracted using random walk methods on the horizon graph as shown in step 320 of FIG. 3.

Let $G(t_c, h)$ be the horizon graph at current time $t_c$ for a window of length h. Let $\pi(j, i, t_c, h)$ be the probability of a random walk starting at node i visiting node j in graph $G(t_c, h)$, where the random walk restarts with probability $\lambda$ at node i. Let $\alpha$ be a coverage parameter in (0, 1). Then, the random walk neighborhood $Q(i, t_c, h)$ of node i, is a minimal set of nodes with the largest values of visit probability, such that $$\sum_{j \in Q(i,t_c,h)} \pi(j, i, t_c, h) \geq \alpha \sum_{All\ nodes\ j} \pi(j, i, t_c, h)$$

In other words, the temporal walk neighborhood of node i represents most of the nodes which are likely to be visited by a random walk starting at node i. The value of $\alpha \in (0, 1)$ represents the level of coverage of this random walk. Since $\lambda$ represents the restart probability at node i, larger values of $\lambda$ result in a neighborhood which is tightly connected to node i. By picking small values of $\alpha$ and large values of $\lambda$, the random walk is restricted to a relatively small neighborhood. Otherwise, the neighborhood becomes more diffuse, and covers larger parts of the network.

A variation on the temporal walk neighborhood is the backward temporal walk neighborhood, which is computed in exactly the same way as the temporal walk neighborhood. The backwards walk neighborhood is denoted by $R(i, t_c, h)$, and is defined in exactly the same way as the forward walk neighborhood $Q(i, t_c, h)$, except that the directed edges are followed in the backward direction during the random walk process.

In the case of undirected graphs, the problem is simplified, since the forward and backward neighborhoods do not need to be computed separately, and a neighborhood can be extracted. Correspondingly, this also reduces the number of features for the undirected case. Once the neighborhoods have been constructed, the following set of temporal features are generated directly from the neighborhood:

Neighborhood Size: This is the total number of nodes in the neighborhoods $Q(i, t_c, h)$ and $R(i, t_c, h)$. Thus, two features corresponding to the neighborhood size may be extracted.

Neighborhood Class Concentration: This is the probability-weighted fraction of the neighborhood of node i, which belongs to a particular class (e.g., the concentration of abnormal or relevant nodes in the neighborhood). Thus, a total of k features can be generated for each of the forward and backward neighborhoods, corresponding to the k different classes. The random walk probabilities on the nodes are used as weights during the computation of the class concentrations.

A critical issue is that the random walk process is inherently slow from a computational perspective. Furthermore, the random walk computation needs to be performed separately for each node, and this can become rather slow in an extremely large network. Therefore, it is critical to be able to design fast methods for the feature extraction process. An important observation is that the typical path lengths for which the collective classification is performed are relatively small, when $\lambda$ is set to relatively large values (larger than 0.5), the probability values $\pi(., ., ., .)$ are almost zero for all the other nodes, except those in the well connected neighborhood of node i. Such probability values do not need to be explicitly tracked, and therefore sparse data structures can be used for the feature extraction process.

The weights on each edge can be converted into random walk transition probabilities for each time window of length h. Specifically, for the horizon graph $G(t_c, h)$, the transition probability on edge $(i, j)$ is given by the following relationship:

$$P_{ij}(t_c,h) = w_{ij}(t_c,h) / \Sigma_k w_{ij}(t_c,h)$$

Note that the weights can be maintained easily in the stream scenario by adding the weights of incoming edges in the last window of length h, and subtracting the weight of the stale edges which drop off at the other end of the window at $t_c$–h. The features are extracted at periodic intervals, which are also referred to as ticks. These ticks are typically spaced at intervals which correspond to the smallest of the window lengths which are used for the feature extraction process.

At this point, the first step is to compute the transition probabilities of the edges. Once these have been computed, start off by setting $\pi(i, i, t_c, h)$ for each node to 1. All other values of $\pi(j, i, t_c, h)$ are implicitly initialized to 0, by virtue of the fact that their values are not available. For any given node j, a list of all the non-zero values of $\pi(j, i, t_c, h)$ is maintained. Since an iterative approach is used, these values in the t-th iteration are referred to by $\pi^{t+1}(j, i, t_c, h)$. This is referred to as the non-zero reachability list of node j, and this is expected to be a very small fraction of the nodes in the network for large restart values. A repeated process of scanning all distinct edges in the graph $G(t_c, h)$ sequentially is used, and the transition probabilities $\pi^{t+1}(j, i, t_c, h)$ from $\pi^t(j, i, t_c, h)$ are updated. Each $\pi^{t+1}(j, i, t_c, h)$ is initialized to the restart probability $\lambda$, and their non-zero lists are set to these singleton nodes. Subsequently, while scanning each edge (s, q), the following update is made for every non-zero probability $\pi^t(s, r, t_c, h)$ in the non-zero list for node s:

$$\pi^{t+1}(q,r,t_c,h) \Leftarrow \pi^{t-1}(q,r,t_c,h) + \pi^t(s,r,t_c,h) \cdot (1-\lambda) \cdot p_{sq}$$

Note that in many cases, the value $\pi^{t+1}(q, r, t_c, h)$ may not be available on the non-zero list of node q, and therefore it is assumed to be 0 on the right hand side of the equation above. In such a case, the value now moves into the non-zero list after the addition. However, if the value of $\pi^t(s, r, t_c, h) \cdot (1-\lambda) \cdot p_{sq}$ is too small, and less than a user-defined threshold $\epsilon$, then this update is ignored, and the corresponding probability does not move onto the non-zero list. This is because the effect of the update of the equation above is negligible. This approximation is done in order to maintain a high level of sparsity, which ensures both the space-efficiency of maintaining the different probability values (small non-zero lists), as well as the time-efficiency of future updates. For large values of the restart probability, only a small number of scans (e.g., two or three) of the edge set are sufficient to provide reasonable approximate values of the random walk probabilities. It is evident that this approach only needs to make a small number of passes over the edges in order to construct the random walk probabilities. Furthermore, note that in order to compute both forward and backward random walk probabilities over different horizons, it is possible to modify the approach above to track these different probabilities simultaneously. The main difference in the update process is the use of different transition probabilities and directions for each edge. Thus, for each edge scanned, it is possible to perform multiple updates for the different kinds of horizons and edge directions simultaneously.

Once the random-walk probabilities have been constructed, the features can be extracted from the non-zero lists at the different nodes. Note that the non-zero lists at each node j correspond to the nodes from which node j is reachable in the walk with non-zero (or more precisely, at least $\epsilon$) probability. In order to determine the backwards neighborhood of a node, the reverse needs to be determined, i.e., all nodes, which are reachable from a node with non-zero probability. Therefore, the non-zero lists are re-organized by origin rather than destination. Once this is done, the neighborhood size is simply the size of the list of nodes reachable from that node, which correspond to at least a fraction $\alpha$ of the total probability. The class concentrations of each class is similarly determined. Thus, the following set of features can be extracted directly and dynamically at each tick: (a) forward and backward neighborhood sizes; and (b) neighborhood concentrations over different classes. These extracted features are reported at step 330 of FIG. 3.

Figure 4:
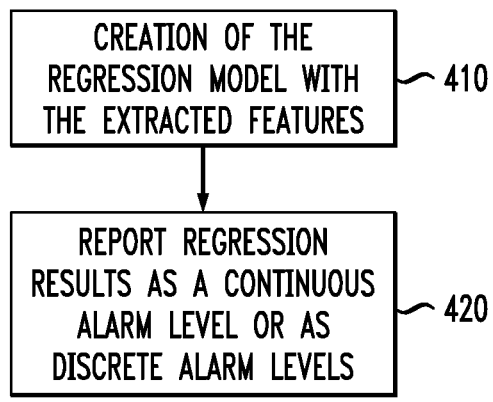
FIG. 4 depicts a regression modeling process of the methodology of FIG. 2.

With reference to FIG. 4, which corresponds to step 230 of FIG. 2, the process of differential classification with these dynamically extracted features is as follows. At step 410, the features extracted can be used for real time determination of differential classification events. Just as the features are extracted for a particular window of time in the past, the classification events are predicted for a particular window of time in the future. Specifically, the features from the past window of length h are used to make a probabilistic prediction about whether or not an event will occur in a future window of length h.

The horizon probability for a differential classification event $(i, l_2, t_c, h)$ for node i, label $l_2$, current time $t_c$ and a future window of length h is the probability that the class label of node i will change from its current class label $l_1$ to the label $l_2$, e.g., a class label change from normal to abnormal, within the future time-interval $(t_c, t_c+h)$. Note that the definition above is valid only for scenarios in which the current label $l_1$ of the node i is not $l_2$.

In order to estimate the probability of the classification label changing from $l_1$ to $l_2$, two separate probabilities are estimated:
(1) The probability of the event $E(l_1 \Leftarrow, h)$ that the label of node i changes from $l_1$ in the time window $(t_c, t_c+h)$ to some other label.
(2) The probability of the event $E(\Leftarrow l_2, h)$ that the label of node i changes from some other label to label $l_2$ in time $(t_c, t_c+h)$.

The above two probabilities can be estimated in the stream scenario with the use of simple additive computations. The composite probability of the event $E(l_1 \Leftarrow l_2, h)$ can then be estimated as the product of these two probabilities.

The probabilities of the two events above can be estimated with the use of a linear classification model. A separate-prediction process is used for each feature with the use of a linear classification model. The prediction values are then averaged over the different features, in order to provide the final result.

That is, let $x_1 \ldots x_r$ be the set of streaming feature values, each of which are placed at intervals of length h. These are the neighborhood sizes and class concentrations, which are used for the purposes of regression modeling. Then, the features $\delta x_2 \ldots \delta x_r$ are generated, which are defined by the subtractive relationship $\delta x_i = x_i - x_{i-1}$. The value of $\delta x_i$ may be either positive or negative, depending upon the change in the corresponding feature value.

The change events may be learned as a linear function of the change in feature values. Each feature value is extracted at intervals of length h, and the binary change indicator, which suggests whether or not event $E(l_1 \Rightarrow, h)$ occurs in the interval between the extraction of feature $x_i$ and $x_i+1$ be denoted by $z_i$. The value of $z_i$ is 1 if the label of the node changes from $l_1$, and 0 otherwise. The probability of the binary change indicator is modeled in terms of the differential $\delta xi$ as follows:

$$P(z_i=1) = a \cdot \delta x_i + b \forall_i \epsilon \{2 \ldots r-1\}$$

The values of $z_i$ are exactly known in the past history of the stream. $P(z_i=1)$ is either equal to 1 or 0, depending upon whether $z_i$ is 1 or 0. It is desirable to pick the parameters a and b, so that the condition $z_i = a \sim \delta x_i + b$, based on the past history, is satisfied as closely as possible.

The probability of a change in the class label is then modeled as a function of these new features. Specifically, the neighborhood size and the neighborhood class concentration are related to the probability of a change in the label. To create or construct a regression model, any method of regression modeling may be used, e.g., a standardized least-squares error regression modeling technique. The function is then used in order to create or generate a continuous alarm level from the underlying feature values, that is, an alarm level is generated at each time instant t for each node. The alarm level represents a numerical score indicating the likelihood of a change event, such that higher values indicate greater likelihood of a change event. Since the input graph stream is continuous, it follows that the output is a continuous alarm level stream for each node and there is a constant monitoring or supervising of the nodes in the graph stream. Accordingly, the output can be reported as a continuous alarm level and displayed via a user interface at step 420 of FIG. 4 and corresponding step 130 of FIG. 1 and step 240 of FIG. 2. For example, an output for a node can be in the form of a sequence of numerical values at each time-stamp, e.g., 2 4 3 5 1 6 6 7 3, with higher values indicating a greater likelihood of change.

If desired, a threshold can be applied to the alarm level in order to create a discrete output. The threshold value could represent a value beyond which the node is considered abnormal or an anomaly. The threshold can be pre-determined by a user or by any other suitable means. The user can determine from the results if one or more alarm levels associated with the nodes in the graph stream are abnormal or an anomaly. For example, a low score (low alarm level) associated with a node may be indicative of a normal situation, whereas a high score (high alarm level) may be indicative of an anomaly or abnormal situation which requires attention. It is to be noted that while an illustrative embodiment of the invention displays the alarm levels as numerical scores, other forms of display may also be generated to alert the user to the presence of a detected change representing an anomaly.

Illustrative embodiments of the present invention may be a system, a method, and/or a computer program product. The computer program product may include a computer readable storage medium (or media) having computer readable program instructions thereon for causing a processor to carry out aspects of the present invention.

Figure 5:
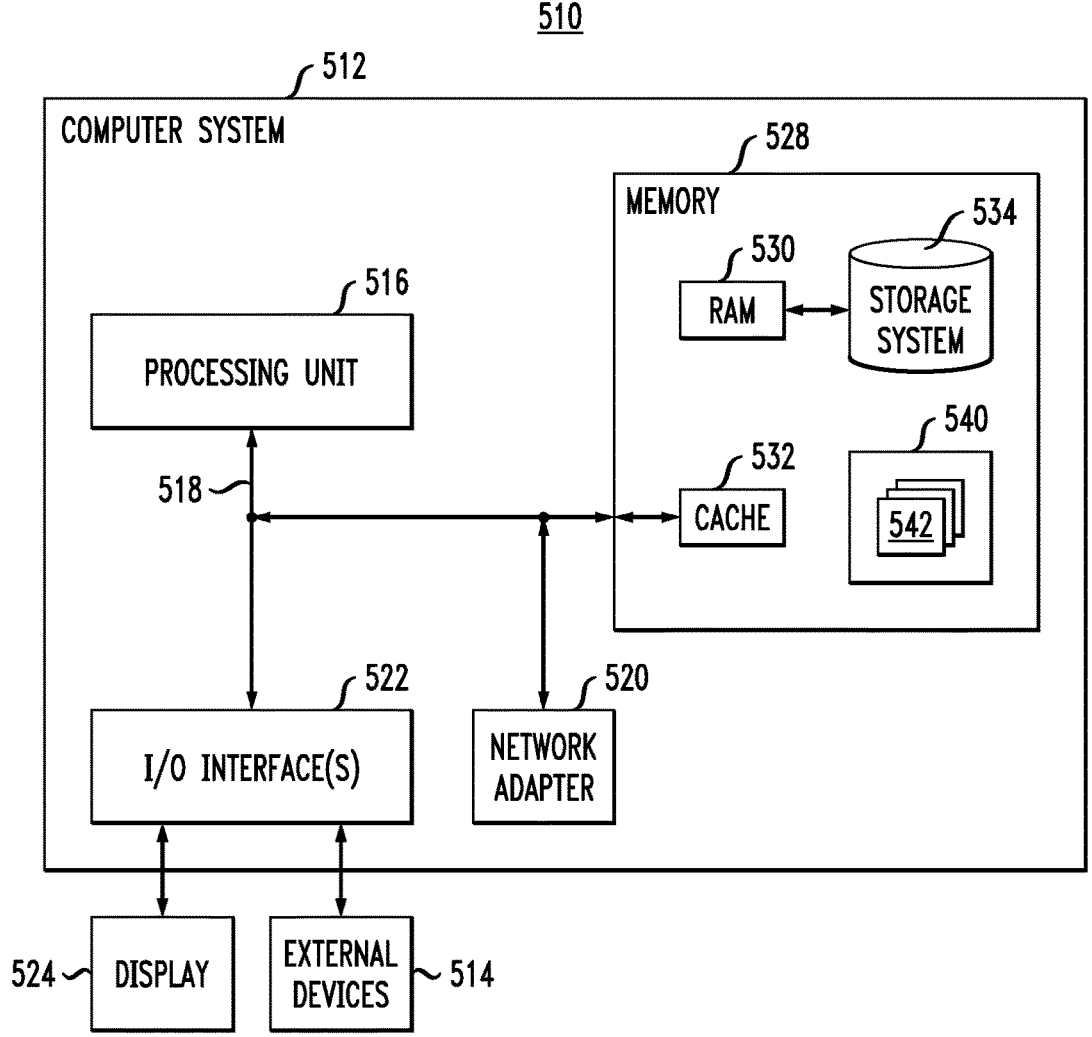
FIG. 5 depicts a computer system in accordance with which one or more components/steps of techniques of the invention may be implemented according to an embodiment of the invention.

Accordingly, the architecture shown in FIG. 5 may be used to implement the various components/steps shown and described above in the context of FIGS. 1-4.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A method, comprising the steps of:
obtaining a graph stream;
obtaining historical data of one or more nodes associated with the graph stream, wherein each node has associated with it a time-dependent label representative of activity of the node at a given time;
extracting one or more features from the graph stream for one or more nodes; and
creating one or more alarm levels for the one or more nodes based on the one or more extracted features and the historical data, wherein the step of creating one or more alarm levels comprises generating a regression model based on the one or more extracted features and the historical data and further wherein each of the one or more alarm levels is indicative of a probability of a change in a label class of an associated node in the graph stream;
wherein the steps are performed by at least one processor device coupled to a memory.

2. The method of claim 1, wherein the step of extracting one or more features from the graph stream comprises creating a horizon graph.

3. The method of claim 2, wherein the step of extracting one or more features from the graph stream further comprises using a random walk method on the horizon graph to construct one or more neighborhoods.

4. The method of claim 1, wherein the one or more features extracted from the graph stream comprises one or more neighborhood features.

5. The method of claim 4, wherein the one or more neighborhood features comprises a neighborhood size.

6. The method of claim 4, wherein the one or more neighborhood features comprises a neighborhood class concentration.

7. The method of claim 4, wherein the one or more alarm levels are generated as a score for each of the one or more nodes at each time instant.

8. The method of claim 1, further comprising reporting the one or more alarm levels as a continuous time series for one or more nodes.

9. The method of claim 1, further comprising applying a threshold to the one or more alarm levels.

10. The method of claim 9, wherein an alarm level associated with a node that exceeds the threshold is indicative of an anomaly.

11. The method of claim 9, wherein the one or more alarm levels are displayed as a discrete output.

12. The method of claim 1, wherein the graph stream is associated with at least one pair-wise activity between two parties.

13. An apparatus comprising:
a memory; and
a processor operatively coupled to the memory and configured to:
obtain a graph stream;
obtain historical data of one or more nodes associated with the graph stream, wherein each node has associated with it a time-dependent label representative of activity of the node at a given time;
extract one or more features from the graph stream for one or more nodes; and
create one or more alarm levels for the graph stream based on the one or more extracted features and the historical data, wherein the one or more alarm levels are created by generating a regression model based on the one or more extracted features and the historical data and further wherein each of the one or more alarm levels is indicative of a probability of a change in a label class of an associated node in the graph stream.

14. The apparatus of claim 13, wherein extracting one or more features from the graph stream comprises creating a horizon graph.

15. The apparatus claim 13, wherein extracting one or more features from the graph stream further comprises using a random walk method on the horizon graph to create one or more neighborhoods.

16. The apparatus of claim 13, wherein the one or more extracted features comprises at least one of a neighborhood size and a neighborhood class concentration.

17. The apparatus of claim 13, wherein the one or more alarm levels are generated as a score for each of the one or more nodes at each time instant.

18. The apparatus of claim 13, wherein the alarm is reported as a continuous time series for one or more nodes.

19. An article of manufacture comprising a computer readable storage medium for storing computer readable program code, which, when executed, causes a computer to:
obtain a graph stream;
obtain historical data of one or more nodes associated with the graph stream, wherein each node has associated with it a time-dependent label representative of activity of the node at a given time;
extract one or more features from the graph stream for one or more nodes; and
create one or more alarm levels for the graph stream based on the one or more extracted features and the historical data wherein the one or more alarm levels are created by generating a regression model based the one ore extracted features and the historical data and further wherein each of the one or more alarm levels is indicative of a probability of a change in a label class of an associated node in the graph stream.

20. The article of manufacture of claim 19, wherein the alarm level is reported as a continuous time series for one or more nodes.

* * * * *